(12) United States Patent
King et al.

(10) Patent No.: US 10,517,239 B2
(45) Date of Patent: Dec. 31, 2019

(54) UPRIGHT IRRIGATION BAG

(71) Applicant: The Patent Store, LLC, Jefferson City, MO (US)

(72) Inventors: L. Herbert King, Jupiter, FL (US); James Lancaster, O'Fallon, MO (US); William Hiner, O'Fallon, MO (US); Aaron Eaton, Wentzville, MO (US); Sandra Wiseman, Foley, MO (US)

(73) Assignee: The Patent Store, LLC, Jefferson City, MO (US)

( * ) Notice: Subject to any disclaimer, the term of this patent is extended or adjusted under 35 U.S.C. 154(b) by 502 days.

(21) Appl. No.: 14/544,167

(22) Filed: Dec. 3, 2014

(65) Prior Publication Data

US 2015/0208597 A1    Jul. 30, 2015

Related U.S. Application Data

(60) Provisional application No. 61/965,337, filed on Jan. 27, 2014.

(51) Int. Cl.

| | |
|---|---|
| *A01G 29/00* | (2006.01) |
| *A01G 27/00* | (2006.01) |
| *A01G 25/00* | (2006.01) |
| *A01G 25/02* | (2006.01) |
| *A01G 25/06* | (2006.01) |

(52) U.S. Cl.
CPC ............ *A01G 29/00* (2013.01); *A01G 25/00* (2013.01); *A01G 25/02* (2013.01); *A01G 25/06* (2013.01); *A01G 27/00* (2013.01); *A01G 27/006* (2013.01); *A01G 2025/006* (2013.01)

(58) Field of Classification Search
CPC ...... A01G 27/006; A01G 27/00; A01G 25/00; A01G 27/005; A01G 27/02; A01G 25/06; A01G 25/02; A01G 25/16; A01G 13/0268; A01G 13/0281; A01G 27/001; A01G 27/06; A01G 1/00; A01G 25/023; A01G 25/14; A01G 9/102; A01G 9/1438; A01G 9/247; A01G 29/00
See application file for complete search history.

(56) References Cited

U.S. PATENT DOCUMENTS

| | | | | |
|---|---|---|---|---|
| 4,087,938 | A | * | 5/1978 | Koch ...................... A01G 29/00 47/48.5 |
| 5,102,259 | A | * | 4/1992 | York ...................... A01G 25/06 405/41 |
| 5,117,582 | A | * | 6/1992 | Cissel, Jr. .............. A01G 23/04 47/21.1 |

(Continued)

*Primary Examiner* — Tien Q Dinh
*Assistant Examiner* — Steven J Shur
(74) *Attorney, Agent, or Firm* — Michael Best & Friedrich LLP

(57) ABSTRACT

An upright open face flexible irrigation bag having a first edge with a first set of zipper teeth and a second edge with a second set of zipper teeth and a slider for in situ securing the first set of zipper teeth to the second set of zipper teeth around a sapling and an emitter wherein the emitter includes flow control through either a restrictive nozzle or an emitter valve or both with both the emitter valve and the restrictive nozzle located external to the irrigation bag and proximate a ground edge of the upright irrigation bag with the irrigation bag including an emitter valve for compensating in a water pressure head in the irrigation bag.

11 Claims, 4 Drawing Sheets

(56) References Cited

U.S. PATENT DOCUMENTS

| | | | | |
|---|---|---|---|---|
| 5,456,044 | A | * | 10/1995 | Parker .................... A01G 9/124 47/21.1 |
| 9,629,313 | B1 | * | 4/2017 | Grossman ............... A01G 25/16 |
| 2004/0222321 | A1 | * | 11/2004 | Golan .................... A01G 25/02 239/542 |
| 2005/0246952 | A1 | * | 11/2005 | Downey ................ A01G 25/02 47/48.5 |
| 2006/0032116 | A1 | * | 2/2006 | Milliken ............ A01G 13/0256 47/21.1 |
| 2008/0271366 | A1 | * | 11/2008 | Thompson ............. A01G 25/02 47/9 |
| 2012/0011773 | A1 | * | 1/2012 | Cross .................... A01G 9/026 47/65.8 |
| 2012/0168536 | A1 | * | 7/2012 | Downey ................ A01G 25/02 239/547 |
| 2013/0212939 | A1 | * | 8/2013 | Li ........................ A01G 27/005 47/48.5 |

\* cited by examiner

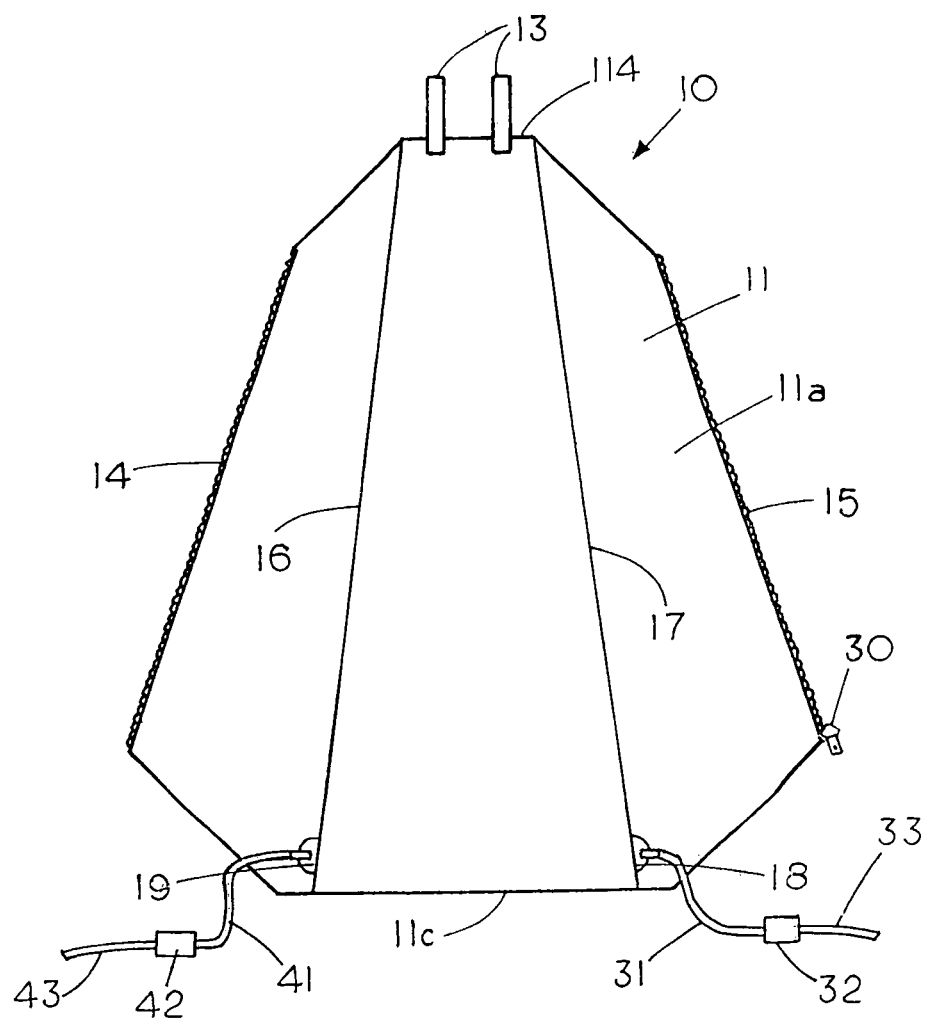
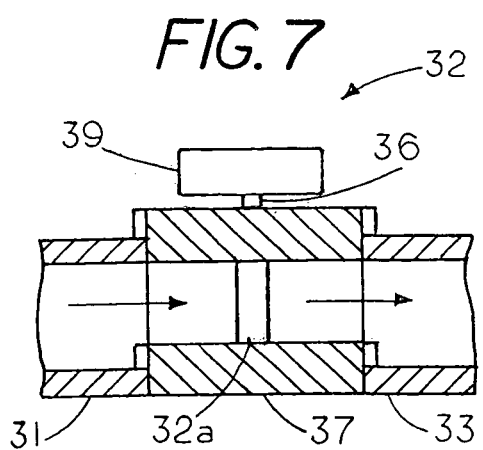
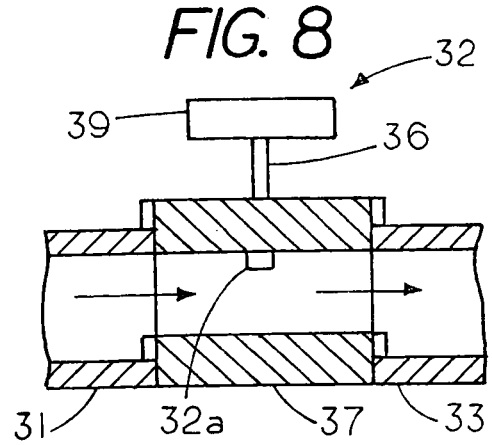

UPRIGHT IRRIGATION BAG

CROSS REFERENCE TO RELATED APPLICATIONS

This application claims priority from provisional application 61/965,337 filed Jan. 27, 2014.

STATEMENT REGARDING FEDERALLY SPONSORED RESEARCH OR DEVELOPMENT

None

REFERENCE TO A MICROFICHE APPENDIX

None

BACKGROUND OF THE INVENTION

Irrigation bags are known in the art and typically comprise a flexible bag with a compartment for water storage. In the upright irrigation bag the irrigation bag extends vertically upward and is partially supported by a sapling. The upright irrigation bags contain a fold with a weep hole or emitter that slowly releases water into the soil.

Another type of irrigation bag is a doughnut shaped irrigation bag that lays flat around the base of a tree with the irrigation bag having an annular shaped water compartment and a hole or emitter on the underside of the bag for directing water into the soil around the base of a tree.

Both types of irrigation bags are useful, however, in field use the emitter or hole in the irrigation bag for delivery of irrigation water may become clogged and prevent irrigation water from being delivered to the soil. In other instance the irrigation bag may over irrigate due to climatic conditions. In still other instances the amount of irrigation water supplied to the surrounding soil is dependent on the amount of irrigation water in the irrigation bag.

SUMMARY OF THE INVENTION

An upright open face flexible irrigation bag having a first edge with a first set of zipper teeth and a second edge with a second set of zipper teeth and a slider for in situ securing the first set of zipper teeth to the second set of zipper teeth around a sapling and an emitter wherein the emitter includes flow control through either a restrictive nozzle or an emitter valve or both with both the emitter valve and the restrictive nozzle located external to the irrigation bag and proximate a ground edge of the upright irrigation bag. The restricted nozzle having a secondary downstream passage therein for slow release of water directly from the irrigation bag into the soil around the irrigation bag or through a downstream water line and an emitter valve with a manually adjustable opening to adjust a flow rate through a secondary downstream passage.

BRIEF DESCRIPTION OF THE DRAWINGS

FIG. 6 shows a front view of an upright irrigation bag with emitters and secondary irrigation lines attached thereto;

FIG. 7 is a cross sectional view of an emitter valve in a closed condition with a secondary irrigation line attached thereto;

FIG. 8 is a cross sectional view of the emitter valve in the open condition for delivery of water to an irrigation line.

DESCRIPTION OF THE PREFERRED EMBODIMENT

Figure 1:
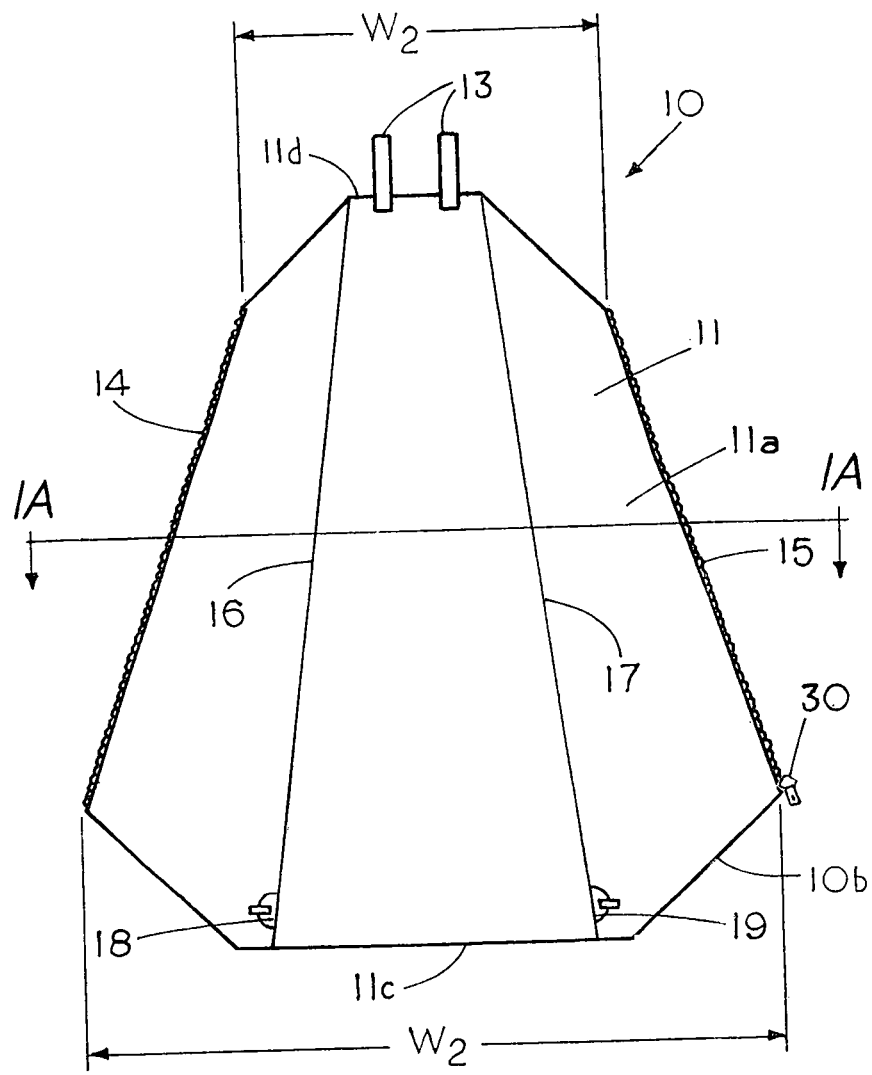
FIG. 1 is a front view of an upright irrigation bag for placing around a sapling.
Figure 1A:
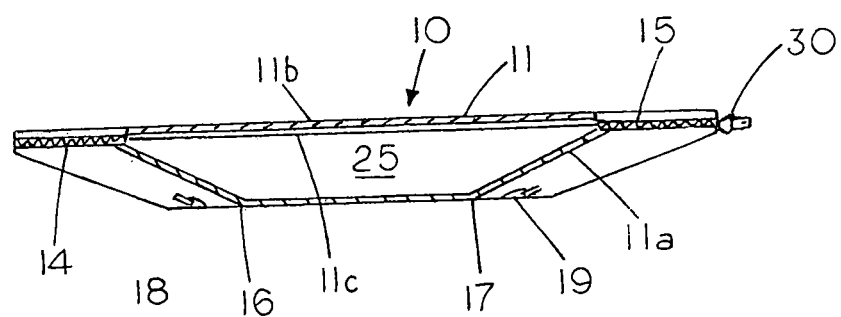
FIG. 1A is a sectional view taken along lines 1A-1A of FIG. 1.

FIG. 1 shows a frontal view of an inside flexible trapezoidal shaped waterproof panel 11a that forms one side of an upright irrigation bag 10 with FIG. 1 showing the bag 10 in an open face condition or unconnected condition for placement around a sapling. A first fold or seam 16, extends from top edge 11d to bottom edge 11c along a front panel 11a and a second fold or seam 17 also extends from top edge 11d to bottom edge 11c along panel 11a. The peripheral edge of back flexible waterproof panel 11b attaches to the peripheral edge of front waterproof panel 11a as shown in FIG. 1A to form a double layer with a space therebetween forming a flexible water compartment 25 between the front panel 11a and the back panel 11b.

Figure 2:
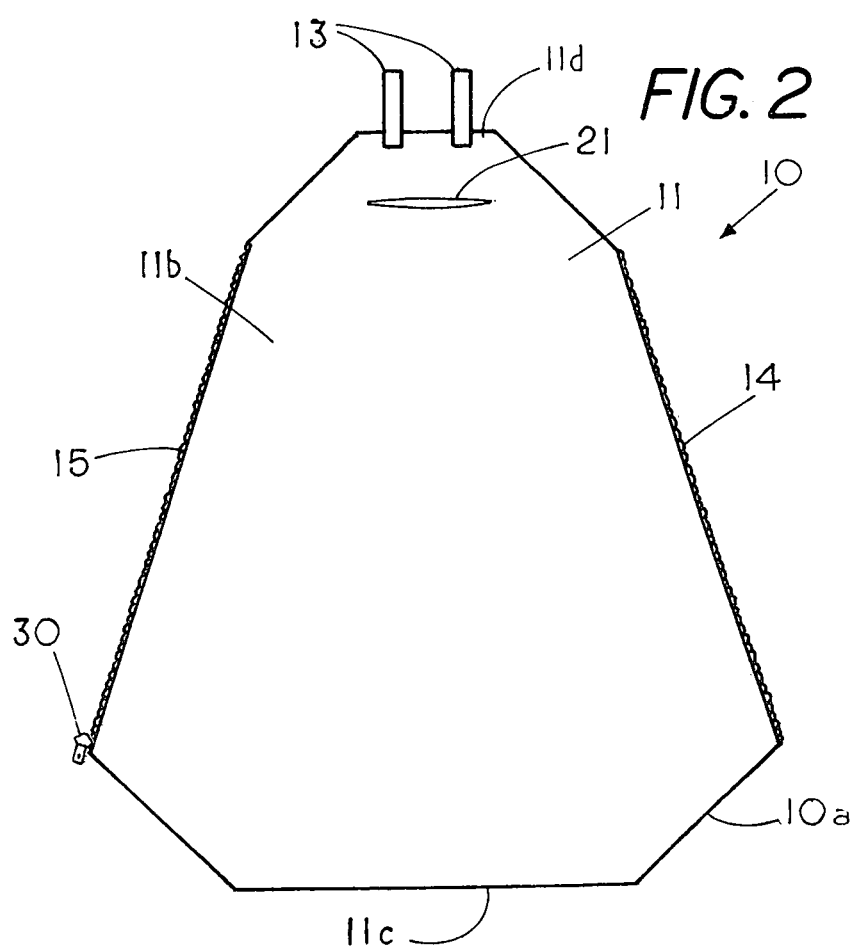
FIG. 2 is a back view of the upright irrigation bag of FIG. 1.

In this example, the peripherally edge in irrigation bag 10 includes a first set of zipper teeth 14, which are located along a portion of one edge of the irrigation bag. A second set of zipper teeth 15, which are located along a further portion the peripheral edge of the irrigation bag 10. In this example zipper teeth 14 and 15 converge from bottom or ground edge 11c toward a top edge 11d of the irrigation bag. In the open or flat condition, as shown in FIG. 1 and FIG. 2, the irrigation bag can be placed alongside and around a tree trunk of a sapling or the like. Once positioned proximate the sapling the irrigation bag is wrapped around a sapling until the zipper teeth 14 and zipper teeth 15 can be engaged. Next, one slides zipper slider 30 along zipper teeth 15 and zipper teeth 14 to bring the set of zipper teeth 15 and the set of zipper teeth 14 into zipped engagement with one another, which forms the upright irrigation bag 10 into an annular member around the sapling. The zipper teeth allow for in situ formation of an irrigation bag that encircles a sapling without having to place the irrigation bag over the top of the sapling. Likewise the irrigation bag 10 can be quickly removed from around the sapling by unzipping teeth 14 and 15 from each other with zipper slide 30.

Figure 3:
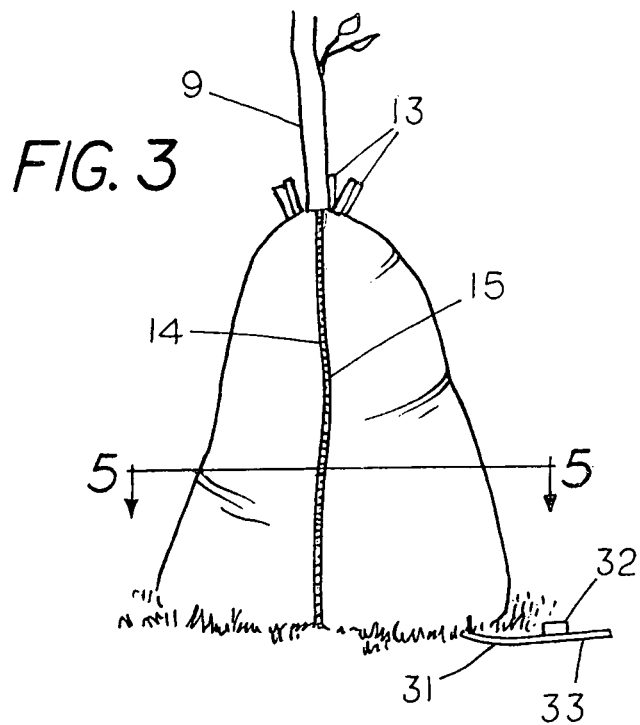
FIG. 3 shows the upright irrigation bag of FIG. 1 located around a sapling with a secondary water line with an emitter valve.

As shown in FIG. 1 the lower ground width $W_2$ of the irrigation bag at the termination of the zipper 14 and 15 is greater than the top width $W_1$ at the termination of the top of zipper 14 and zipper 15 so that when the edges of the irrigation bag are zipped together the top portion of the irrigation bag forms a smaller annular tree opening than a bottom annular tree opening which brings the top portion of the irrigation bag 10 into closer proximity to the sapling than the bottom portion of the irrigation bag, which as shown in FIG. 3 allows the irrigation bag 10 to be maintained an upright condition around a sapling when the irrigation bag 10 is filled with water.

FIG. 1 and FIG. 2 show a set of handles 13, which are attached to a top portion of the irrigation bag. The handles 13 allow a person to hold the irrigation bag 10 in an upright condition proximate a sapling during the filling of the irrigation bag 10 with water. Handles 13 may be flexible straps or flexible strap loops that are secured to panel 11a to allow a person to hold the irrigation bag 10 in an upright condition with one hand as the other hand may hold a hose, which is used to fill the irrigation bag 10 with water. In some instances handles 13 may be used for transporting an irrigation bag containing water. For example, one may want to fill the irrigation bag 10 at an offsite location and deliver a water filled irrigation bag in an unzipped condition to a sapling site where the water filled irrigation bag 10 is placed around the tree sapling. Once positioned proximate the tree the zipper teeth 14 and zipper teeth 15 are zipped together to form a water storage compartment around the tree sapling that can hold and slowly deliver water to the sapling. In this example the handles form a convenient means for either lifting the irrigation bag into position but in some cases one may want to laterally slide the filled irrigation bag 10 to a position around the tree sapling thus avoiding the need to lift the filled water irrigation bag into an irrigating position around a sapling.

Once irrigation of the sapling is complete or the water is spent one slides the zipper slider 30 along the zipper teeth to separate the zipper teeth 14 and 15 of the irrigation bag 10 to permit quick easy lateral removal of the irrigation bag 10 from around a sapling. The irrigation bag may then be reused for irrigating other saplings.

FIG. 2 shows a frontal view of the exterior flexible waterproof panel 11b of the irrigation bag 10, which is similar to panel 11a but lacks folds therein necessitated by having a width of the exterior panel 11a larger than the width of the internal panel 11b. The panel 11a and panel 11b, which form a water compartment 25 (FIG. 1A) therein, are joinable to each other at a peripheral edge by the set of zipper teeth 14 and the set of zipper teeth 15, which are part of the peripheral edge located around panels 11a and 11b. Once the edges are joined with the zipper teeth 14 and 15 the panel 11a and 11b form an annular water ring around a sapling or the like.

FIG. 3 shows the irrigation bag 10 forming a water ring that is located around a sapling 9 with the irrigation bag filled with irrigation water. For on site filling the irrigation bag 10 water may be poured or directed from a hose into the irrigation bag through a top slit or opening 21 in the exterior panel 11b of irrigation bag 10 (FIG. 2). In some cases the slit may be replaced by a hose fitting to enable direct coupling to a garden hose or the like.

During the irrigation process the irrigation bag 10 remains in an upright condition supported by its configuration and the sapling as water slowly leaks from an emitter 18 or an emitter 19, which is located at the bottom of the panels 11 and 12 and behind the folds in the irrigation bag 10. In this example, attached to emitter 18 is a flexible line 31 and a variable area emitter valve 32. The downstream side of emitter valve 32 contains an elongated irrigation tube 33 which may be used for delivery of water to soil proximate the exterior of the irrigation bag. Elongated irrigation tube 33 may be flexible or rigid. Similarly, attached to emitter 19 is a flexible line 41 and a variable area emitter valve 42 and an elongated irrigation tube 43. In other examples the irrigation emitter valve and flexible line may be omitted.

As shown in FIG. 6 the downstream side of emitter valve 42 contains an elongated irrigation tube 43 which may be used for delivery of water to soil proximate the exterior of the irrigation bag. Elongated irrigation tube 43 may be flexible or rigid. Similarly, the downstream side of emitter valve 32 contains an elongated irrigation tube 33 which may be used for delivery of water to soil proximate the exterior of the irrigation bag. Likewise elongated irrigation tube 33 may be flexible or rigid, however, if the irrigation tubes are placed beneath the irrigation bag one should use irrigation tubes that are sufficiently rigid to maintain themselves in an open condition in the event the irrigation rests on top of the irrigation tube.

In some cases the irrigation tube 43 or 33 may have radial perforations for delivery of irrigation water along the irrigation tube and in other cases the irrigation tube may lack radial perforations to enable the irrigation water to be delivered to an area at the end of the irrigation tube. This feature works well where there are adjacent smaller saplings since a branch tube may be attached to the irrigation bag to provide for a more efficient delivery of irrigation water since only one irrigation bag may be needed for multiple smaller saplings.

Figure 5:
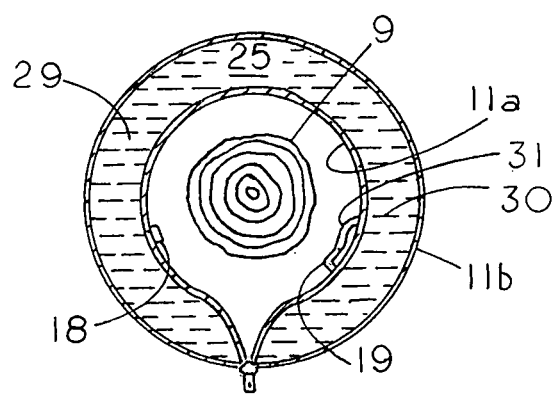
FIG. 5 shows a cross sectional view of the upright irrigation bag taken along lines 5-5 of FIG. 3.

FIG. 5 is a cross sectional view taken along lines 5-5 of FIG. 3 to reveal a water compartment 25 formed between panel 11a and panel 11b. Attached to the interior panel 11a are emitters 18 and 19 for emitting water 29 therefrom in response to the water head generated by the water contained in compartment 25. Emitters 18 and 19 are positioned proximate a ground edge 11c of the irrigation bag 10 with a terminal end extending outward beyond the fold 16 and fold 17. In the example shown in FIG. 6 emitter 19 directs water into the soil located proximate the sapling 9 through tubing 41, emitter valve 42 and tubing 41. Similarly, the second emitter 18 includes a flexible water tube 31 connected thereto with an emitter valve 32 and an elongated irrigation line 33 secured to the downstream side of emitter valve 32.

A reference to FIG. 1 shows that emitters 18 and 19 are located proximate a ground end 11c of the irrigation bag 10 with an outlet end extending outward from the fold 16 or 17 to allow irrigation water in the bag 10 to trickle into the soil when the irrigation bag is located in an upright condition around the periphery of a sapling. Emitter 18 and 19 are sufficiently rigid so that they can be placed underneath the irrigation bag when in the full condition without having the pressure of the irrigation bag close off the restricted inlet passage 23a of nozzle 23.

Figure 4:
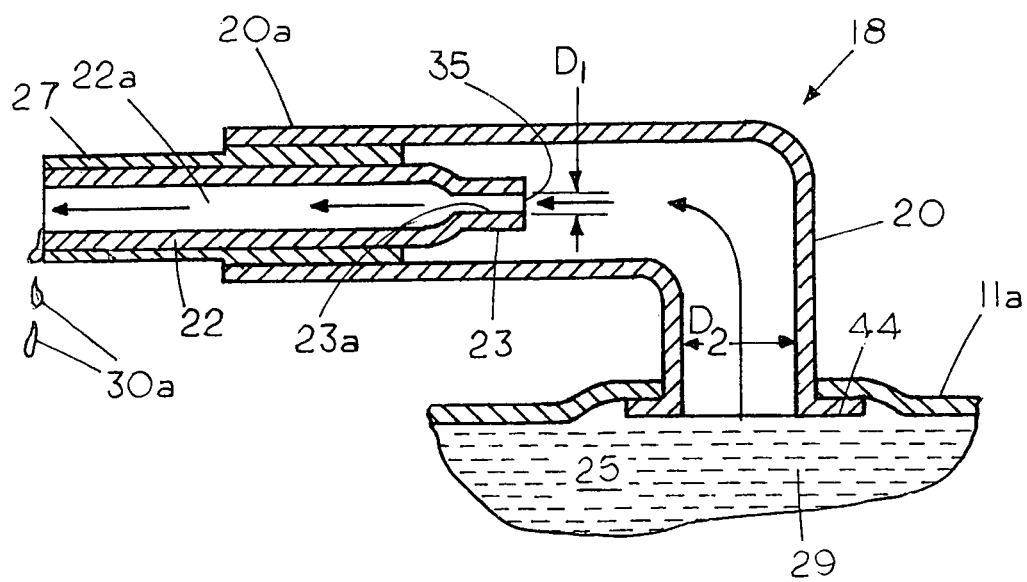
FIG. 4 shows an isolated view of an emitter.

FIG. 4 shows a cross sectional view of the emitter 18 which comprises a rigid tube or elbow 20 that has a first end with a flange 44 which is secured to interior panel 11a and a second outer end 20a for attachment to a drain tube. In this example elbow 20 extends at a right angle or an acute angle from the flange base 44 to form a low profile so that the irrigation bag 10 may rest on the elbow without hindering flow therethrough. The outer end 20a of elbow 20 includes a cylindrical insert 22 having a restrictive nozzle 35 with a restricted inlet passage 23a for water to enter though nozzle end 35. The diameter $D_1$ of the restrictive inlet nozzle 23 is less than the diameter $D_2$ of the passage from the water compartment 25. The diameter of the nozzle end 35 limits the flow of water 29 therethrough. Located downstream of restricted nozzle 23 is a larger diameter passage 22a that delivers the irrigation water droplets 30a to a sapling proximate the irrigation bag. The use of a restricted inlet passage 23a, which is located in nozzle 35 that cantilevers outward into a larger passage 22a, may reduce blockages of nozzle end 35 from contaminants in the irrigation bag since contaminates in the water can fall away nozzle end 35 due to the circulation of water around nozzle 23, which is caused by the extension of the nozzle end 35 into the larger diameter passage as only a portion of the water in elbow 20 flows into restricted inlet 23a in nozzle 22a from larger passage 27 in elbow 20. As can be seen in this example the restrictive nozzle 35 comprise an intermediate location between the irrigation bag outlet and the elongated irrigation tube 33. In some examples the nozzle 22a may be molded directly into elbow to form an emitter with an integral nozzle for restricting the flow from the irrigation bag.

In irrigation operation water 29 flows, as shown by arrows, into elbow 20 through nozzle 23 and is emitted downstream in the form of water droplets 30a from the end of insert 22, which may be connected to a downstream irrigation line 33 (FIG. 7 and FIG. 8) through a flexible tube or the like.

FIG. 6 shows a front view of an upright irrigation bag 10 with a first emitter 19 with a flexible tube 41 connected to the upstream side of emitter valve 42 and a secondary irrigation line 43 connected to the downstream side of emitter valve 42. Upright irrigation bag 10 also includes a second emitter 18 with a flexible tube 31 connected to the upstream side of emitter valve 32 and a secondary irrigation line 33 connected to the downstream side of emitter valve 32.

FIG. 7 is a cross sectional view of an emitter valve 32 in a closed condition with a secondary irrigation line 33 attached thereto. In the closed condition the shaft 36 extends across the passage 37 to block flow of irrigation water therethrough. Emitter valve 32 includes a hand rotatable valve head 39 that rotates shaft 36 to rotate shaft end 32a into an open or closed condition. A feature of the emitter valve 32 is that it allows a person to adjust the flow rate of irrigation from the irrigation bag 10. That is, in the full condition the water in the irrigation bag is greater than in a partly filled condition since the water head decreases as water flows out of the irrigation bag. Consequently, less water flows out the irrigation bag. The emitter valve allows one to compensate for the loss of water head in the irrigation bag by increasing the open area in the emitter valve to increase the flow rate of water into the soil surrounding the sapling thereby ensuring that the sapling is being properly irrigated.

FIG. 8 is a cross sectional view of the emitter valve 32 in the open condition for delivery of water to an irrigation line 33. In this example the emitter valve head 39 has been rotated to elevate shaft 36 so there is an open passage 37 below the end 32a of the shaft 36 of the emitter valve 32. The opening therein allows irrigation water to enter irrigation line 33 where it can be directed to a region outside of the area surrounded by the irrigation bag through passage 37.

In the example shown herein a zipper slide 30 is in sliding engagement with a first set of zipper teeth 14 and a second set of zipper teeth 15 with the zipper slide 30 slidingly joining the first set of zipper teeth 14 to the second set of zipper teeth 15 through in situ formation of the irrigation bag from a two ended irrigation bag as shown in FIG. 1 and FIG. 2 into an annulus irrigation bag as shown in FIG. 5 around a sapling while the water compartment 25 remains in a non-annular condition.

As emitters 18 and 19 are identical, only emitter 18 is described herein. In operation, emitter 18 slowly releases water 29 from the water compartment 25. In this example the emitter 18 includes a rigid or self-supporting elbow 20 for maintain an open passage therein when the elbow is located on an underside of the irrigation bag. The flange 44 of elbow 20 is preferably secured to panel 11a through an adhesive or the like. The emitter 18 includes a nozzle end 35 located in the elbow 20 with the nozzle end 35 having a smaller opening $D_1$ than an opening $D_2$ in the elbow as well as smaller than a downstream passage 22a in tubing 22. The arrangement enables irrigation water 29 to slowly pass from compartment 25 in the irrigating bag 10 through the nozzle end 35 and into the downstream passage 22a where it can be discharged in to the soil proximate the irrigation bag 10 without the either the pressure of the water bag or impurities in the irrigation water blocking the flow through the nozzle end since debris or impurities are not funneled into the nozzle end 35.

As shown in FIG. 6, FIG. 7 and FIG. 8 the open face upright irrigation bag 10 attaches to a flexible water tube 31 having a one end of the emitter 18 and another end connected to an upstream side of an emitter valve 32 with a manually adjustable stem 36 in the emitter valve having an end 32a for opening and closing a fluid passage therethrough. For ease in operation emitter valve 32 may include a knob with a knurled exterior surface for finger engagement so that as one can rotate stem 36 into and out of the passage in the emitter valve. In this example a flexible tube 33 connects to the opposite or downstream end of the emitter valve 32 for directing irrigation water to soil proximate a sapling or the like.

As illustrated in the figures, the invention further includes a method of irrigating a sapling and a soil area exterior to a soil area located within a peripheral boundary formed by closed ends of the irrigation bag by placing an irrigation bag in an open condition and having an emitter around a sapling. One can then secure a first end of an irrigation bag to a second end of the irrigation bag with a set of zippers to form an annulus around the sapling. In one example the method includes the step of securing a zipper on a first angle side irrigation bag to a second zipper on a second angled side of the bag to form an irrigation bag with an annular top opening that is smaller than an annular bottom opening. Thus, in this example open face upright irrigation bag 10 for placing around a sapling includes a first flexible waterproof panel 11a having a peripheral edge 10b joined to a peripheral edge 10a of a second flexible waterproof panel 11b to form a peripheral seam with first flexible waterproof panel 11a and the second waterproof panel 11b forming a non annular water compartment 25 therebetween (FIG. 5).

As shown in FIG. 1 a first set of zipper teeth 14 located on a first portion of the peripheral seam and a second set of zipper teeth 15 located on a second portion of the peripheral seam converge toward a top edge 11d of the irrigation bag when the irrigation bag is in an unfilled condition to thereby form a smaller annular opening at a top end of the irrigation bag than at a ground or bottom edge 11c of the irrigation bag when the irrigation bag is in a zipped condition as shown in FIG. 1.

FIG. 5 shows that zipper slide 30, which is in engagement with the first set of zipper teeth 14 and the second set of zipper teeth 15, joins the first set of zipper teeth 14 to the second set of zipper teeth 15 for in situ formation of the irrigation bag into an annulus irrigation bag around a sapling while the water compartment 25 remains in a non-annular water shape.

FIG. 6 and FIG. 4 show emitter 18 for releasing water from the water compartment 25 with the emitter extending outward from the irrigation with the emitter including a tube 20 extending at an angle of 90 degrees or less from the base for maintaining a passage therein in an open condition when the tube is located on an underside of the irrigation bag. A flange 44 secures the tube 20, which in this case is an elbow, to a one or both of the waterproof panels 11a and 11b. In this example the emitter 18 including a restrictive passage or nozzle end 35 located therein with the nozzle end 35 having a smaller opening $D_1$ than an opening $D_2$ in elbow 20 and smaller than a downstream passage 22a to enable irrigation water to slowly pass from compartment 25 in the irrigating bag 10 through the nozzle end 35 and into the downstream passage 22a where it can be subsequently discharged to the soil proximate the irrigation bag 10.

In the example of FIG. 6 the open face upright irrigation bag includes a flexible water tube 31 having a one end connected to a free end 27 of the emitter 18 and another end connected to an upstream side of an emitter valve 32 with emitter valve 32 including a manually adjustable stem 36 having an end 32a for opening and closing a fluid passage therein. The emitter valve 32 preferably includes a friction grip such as knob with a knurled exterior for rotation of stem 36. A further flexible tube 33 connects to a downstream end of the emitter valve 32 for directing fluid proximate the irrigation bag.

In this example, one may attach an emitter valve to a tubing extending from a ground end of the irrigation bag to further limit the rate of flow irrigation water from the irrigation bag thus providing two inline fluid restrictions for water emanating from the irrigation bag.

The emitter valve 32 or 42 allows one to change the rate of flow of irrigation water by changing the setting on the emitter valve to control the delivery of irrigation water from the upright irrigation bag. In some instance one may connect an irrigation line to the emitter and extend an end of the irrigation beyond a periphery of the irrigation bag. In addition the invention provides for on-the-go adjusting the passage in the emitter valve to deliver more or less irrigation water to the soil exterior to the periphery of the irrigation bag then to the soil interior to the periphery of the irrigation bag. In some cases one may want to simultaneously supply irrigation water to a soil area within a periphery of the irrigation bag and a soil area located radially outward of the periphery of the irrigation bag. In addition another feature of an external emitter valve 32 that is accessible outside the irrigation bag is that it allows one to quickly shut off the irrigation bag, for example, if rains occurs that make it unnecessary to irrigate the sapling. On the other hand one can bring the irrigation bag into an irrigation condition by opening the emitter valve.

A further feature of the invention is that filling the irrigation bag can be a one person operation since a person may hold a handle of the irrigation bag with one hand while using another hand to direct water into the irrigation bag. Thus, the irrigation bag described herein facilitates filling or refilling as well as providing for control of the flow rate of irrigation water from the irrigation bag.

We claim:

1. An open face upright irrigation bag for placing around a sapling comprising:
    a first flexible waterproof panel having a peripheral edge joined to a peripheral edge of a second flexible waterproof panel to form a peripheral waterproof seam with said first flexible waterproof panel and said second waterproof panel forming a water deformable compartment therebetween;
    a first set of zipper teeth located on a first portion of the peripheral waterproof seam and a second set of zipper teeth located on a second portion of the peripheral waterproof seam;
    a zipper runner in engagement with said first set of zipper teeth and said second set of zipper teeth for joining the first set of zipper teeth to the second set of zipper teeth to form the irrigation bag into an annulus with said water deformable compartment extending partially around said annulus; and
    an emitter for periodically releasing water from the water compartment, said emitter comprising a rigid elbow having a passage with an internal diameter $D_2$ and a flange base secured proximate a lower ground edge of the irrigation bag with the rigid elbow extending at an angle from the base, said emitter having an inlet nozzle with a restricted inlet passage having a diameter $D_1$, said inlet nozzle with said restricted inlet passage cantilevers outward from a larger outlet passage into a portion of the rigid elbow of the emitter wherein an internal diameter $D_2$ of the rigid elbow is larger than an external diameter $D_1$ of the inlet passage so that water and contaminants in the rigid elbow flow toward the restricted inlet passage with the contaminates falling away from the end of the cantilevered restricted inlet passage as the rube irrigation bag emits water that circulates through the rigid elbow and into an open end of the restricted inlet passage in the inlet nozzle in response to a water pressure in the upright irrigation bag.

2. The upright irrigation bag of claim 1 wherein the first waterproof panel comprise an interior panel and the second waterproof panel comprises an exterior panel with the exterior panel having a top opening for filling the compartment with water.

3. The upright irrigation bag of claim 2 wherein the emitter is attached to the interior waterproof panel of the irrigation bag.

4. The upright irrigation bag of claim 1 wherein the interior panel has a fold extending lengthwise along the irrigation bag for expansion of the bag in response to placement of water therein.

5. The upright irrigation bag of claim 4 including an emitter valve having a rotatable shaft rotatable into either an open or a closed position to adjust a water flow from the upright irrigation bag with the emitter valve located downstream of the emitter and an irrigation tube secured to the emitter valve for delivery of water to a region radially proximate the upright irrigation bag.

6. The upright irrigation bag of claim 4 wherein the interior panel has a second fold extending lengthwise along the irrigation bag with a second emitter located proximate a ground edge of the upright irrigation bag.

7. The upright irrigation bag of claim 5 wherein the emitter is attached to the irrigation bag proximate the fold and proximate a ground edge of the irrigation bag with the emitter valve and an irrigation tube are located downstream of the restricted passage.

8. The upright irrigation bag of claim 5 wherein the first set of zipper teeth and the second set of zipper teeth converge toward a top edge of the irrigation bag to form a smaller annular opening at a top of the irrigation bag than at a bottom of the irrigation bag.

9. The upright irrigation bag of claim 8 including a handle located at a top of the irrigation bag.

10. The upright irrigation bag of claim 9 wherein the irrigation bag has an annular shape and the water compartment therein has a non-annular shape.

11. The upright irrigation bag of claim 1 wherein the inlet nozzle protrudes into the rigid elbow of the emitter.

* * * * *